US009688483B2

(12) United States Patent
Graffin

(10) Patent No.: US 9,688,483 B2

(45) Date of Patent: Jun. 27, 2017

(54) INSTALLATION FOR TRANSPORTING CONTAINERS

(71) Applicant: Serac Group, La Ferte Bernard (FR)

(72) Inventor: Andre Jean Jacques Graffin, Winfield, IL (US)

(73) Assignee: SERAC GROUP, La Ferte Bernard (FR)

( * ) Notice: Subject to any disclaimer, the term of this patent is extended or adjusted under 35 U.S.C. 154(b) by 0 days.

(21) Appl. No.: 14/789,302

(22) Filed: Jul. 1, 2015

(65) Prior Publication Data

US 2016/0001986 A1 Jan. 7, 2016

(30) Foreign Application Priority Data

Jul. 2, 2014 (FR) ..................................... 14 56344

(51) Int. Cl.

*B65G 29/00* (2006.01)
*B65G 47/86* (2006.01)
*B65G 47/90* (2006.01)
*B67C 3/24* (2006.01)

(52) U.S. Cl.

CPC ........... *B65G 47/847* (2013.01); *B65G 29/00* (2013.01); *B65G 47/90* (2013.01); *B67C 3/242* (2013.01)

(58) Field of Classification Search

CPC .... B65G 29/00; B65G 47/846; B65G 47/847; B65G 2201/0247

USPC .............. 198/377.01, 447, 470.1, 604, 803.3

See application file for complete search history.

(56) References Cited

U.S. PATENT DOCUMENTS

| | | | | |
|---|---|---|---|---|
| 3,488,994 A | | 1/1970 | Messervey et al. | |
| 3,687,285 A | * | 8/1972 | Messervey .......... | G01M 3/3209 198/370.05 |
| 5,575,379 A | | 11/1996 | Schmetzer | |
| 5,581,975 A | * | 12/1996 | Trebbi ................. | B65G 47/847 53/282 |
| 6,213,309 B1 | * | 4/2001 | Dadisho .................. | B07C 5/362 198/450 |
| 6,692,050 B2 | * | 2/2004 | Graffin ................... | B65G 29/00 198/803.7 |

(Continued)

FOREIGN PATENT DOCUMENTS

| | | |
|---|---|---|
| DE | 10146118 A1 | 4/2003 |
| DE | 10247362 A1 | 4/2004 |

(Continued)

*Primary Examiner* — Douglas Hess

(74) *Attorney, Agent, or Firm* — Muncy, Geissler, Olds & Lowe, P.C.

(57) ABSTRACT

An installation for transporting containers having necks, the installation comprising an intermediate rotary platform provided in its periphery with slots each having a jaw mounted in the vicinity thereof in order to pivot between a closed position and an open position. Each jaw is provided with blocking means for blocking it in each of its positions, and includes a first contact surface projecting into the slot when the jaw is in the open position in such a manner that when the neck is inserted into the slot it pushes against the first contact surface and brings the jaw into the closed position, and a second contact surface facing the slot when the jaw is in the closed position in such a manner that when the neck is discharged from the slot it pushes against the second contact surface and brings the jaw into the open position.

9 Claims, 6 Drawing Sheets

7.1
7.2
17
4
2
1
8.1
10.2
9.2
13.2
12.2
101
8.2
102
7.2
7.1
100

(56) References Cited

U.S. PATENT DOCUMENTS 6,938,753 B2 * 9/2005 Bonatti ................ B65G 47/847
198/470.1
7,823,717 B2 * 11/2010 Zanini ..................... B65B 43/46
198/470.1
7,849,998 B2 * 12/2010 Langlois ............... B29C 49/421
198/470.1
8,002,106 B2 * 8/2011 Preti ...................... B65G 29/00
198/459.2
8,191,948 B2 * 6/2012 Preti .................... B65G 47/847
294/106
8,220,853 B2 * 7/2012 Maeder ................ B65H 29/003
294/106
8,439,413 B2 * 5/2013 Cirio ....................... B67C 3/242
198/803.7
9,353,905 B2 * 5/2016 Gruson .................. F16M 13/02
9,409,729 B2 * 8/2016 Graffin ................. B65G 47/847

FOREIGN PATENT DOCUMENTS

DE 102011006714 A1 10/2012
WO WO 2010/124768 A1 11/2010

* cited by examiner

INSTALLATION FOR TRANSPORTING CONTAINERS

The present invention relates to transporting containers, particularly in a line for processing said containers.

A container processing line, e.g. a filling line, comprises a plurality of stations and in particular a cleaning and/or sterilizing station, a filling station proper, and a container closing station. In order to increase rates of throughput, the containers are processed while they are being moved by means of an installation for transporting containers along the line.

Such a transport installation generally comprises a succession of rotary platforms, each provided with means for holding containers on the platform. The holding means are generally clamps selectively controlled to occupy an open position or a closed position by means of actuators such as pneumatic or electromagnetic jacks, or indeed wheels carried by the clamps for co-operating with stationary cams. This results in the structure being relatively complex, which makes the transport installation difficult to clean. In addition, such means generate particles, particularly when the number of parts moving relative to one another is high.

It is therefore necessary to provide additional nozzles in such installations, which nozzles are dedicated to cleaning cams and wheels.

An object of the invention is to provide a container transport installation that is simpler.

To this end, the invention provides an installation for transporting containers having necks, the installation comprising an intermediate rotary platform provided in its periphery with slots and bordered by a feed unit for bringing containers into the slots and a unit for discharging containers from the slots, a jaw being mounted on the platform in the vicinity of each slot in order to pivot between a closed position for holding the container in the slot and an open position. Each jaw is provided with blocking means for blocking it in each of its positions, and includes a first contact surface projecting into the slot when the jaw is in the open position in such a manner that when the neck is inserted into the slot it pushes against the first contact surface and brings the law into the closed position, and a second contact surface facing the slot when the jaw is in the closed position in such a manner that when the neck is discharged from the slot it pushes against the second contact surface and brings the law into the open position.

Thus, the means for holding the containers on the platform have only one movable jaw that is moved at least in part by the neck of the container on being inserted into the slot. This results in a structure that is simpler, having outside shapes that can be arranged so as to facilitate cleaning and/or decontamination.

Other characteristics and advantages of the invention appear on reading the following description of particular, non-limiting embodiments of the invention.

Reference is made to the accompanying drawings, in which.

Figure 1:
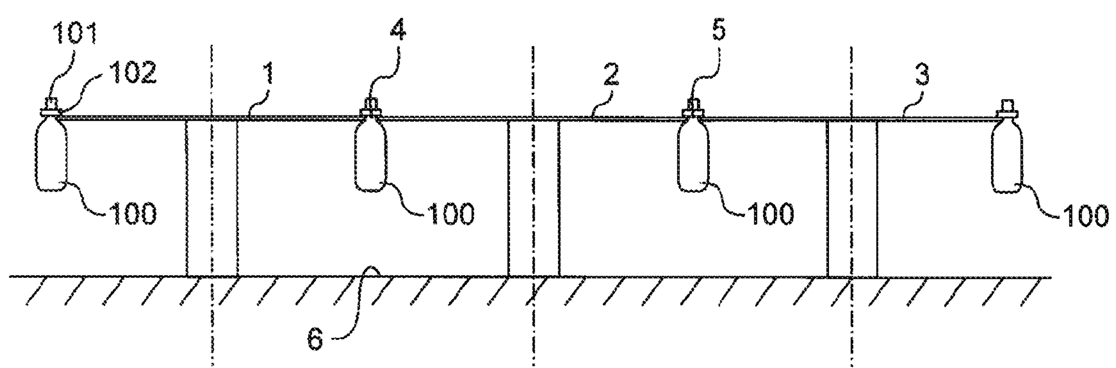
FIG. 1 is a diagrammatic elevation view of a transport installation of the invention.
Figure 2:
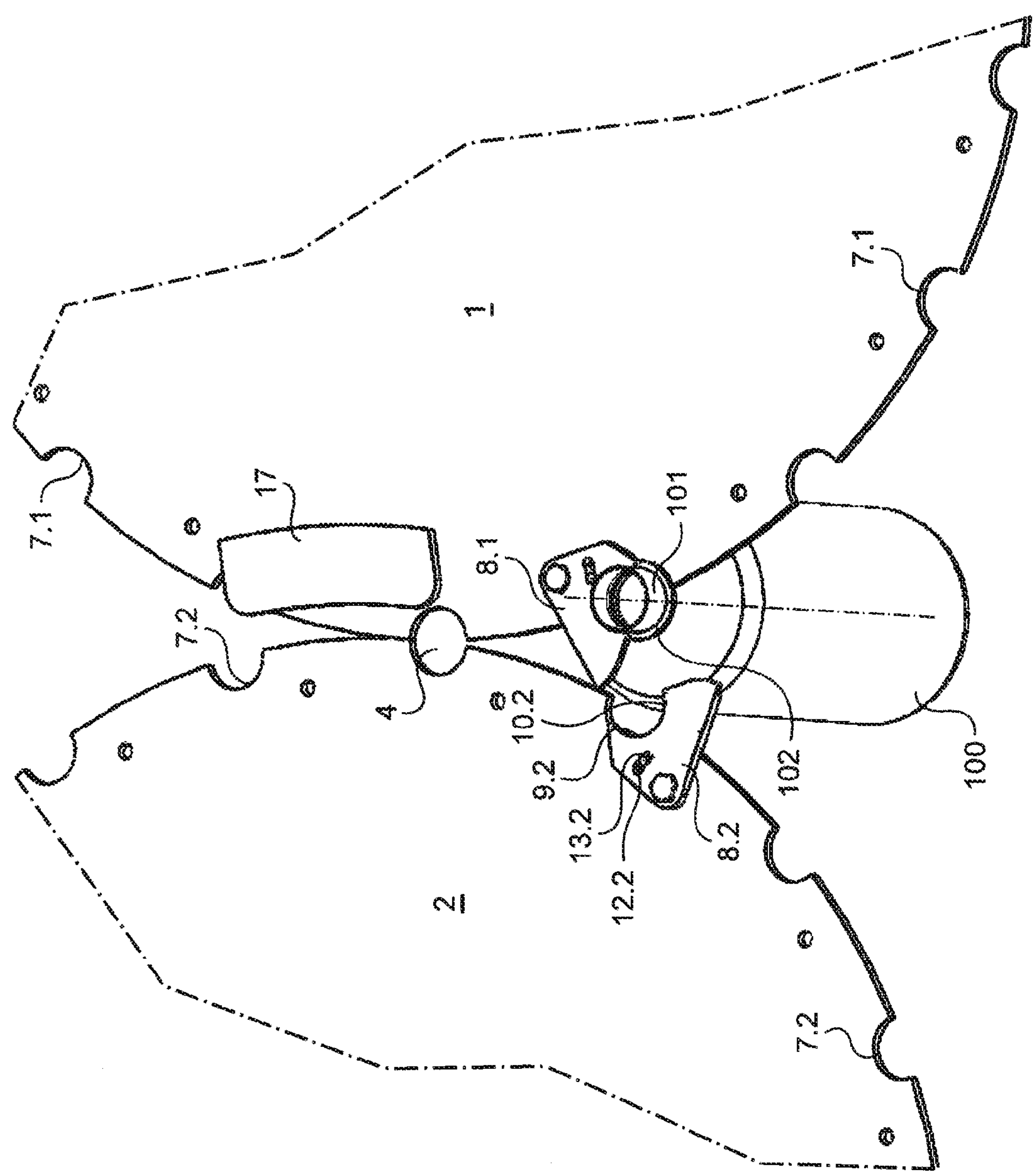
FIG. 2 is a diagrammatic detail view in perspective and from above of a zone 11 in FIG. 1.
Figure 3:
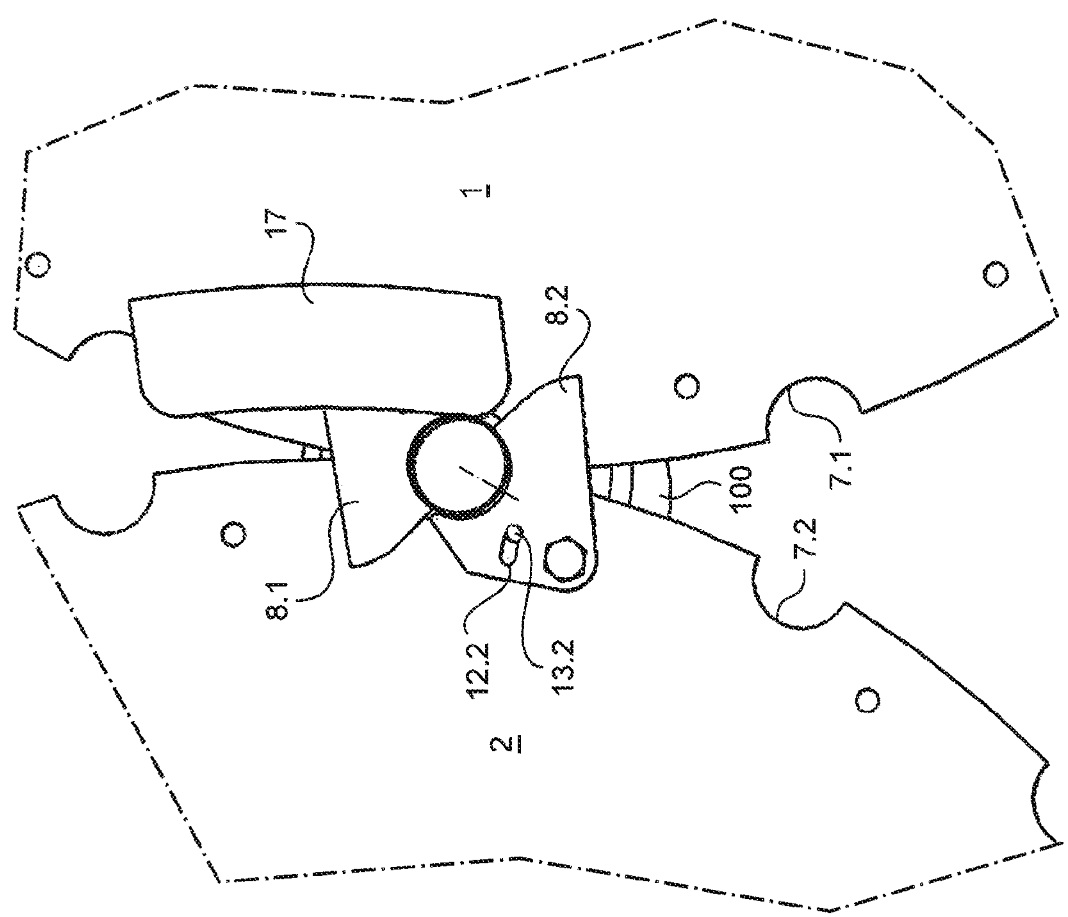
FIGS. 3 to 5 are views analogous to FIG. 2 showing stages in the transfer of a container between two platforms of the installation.
Figure 4:
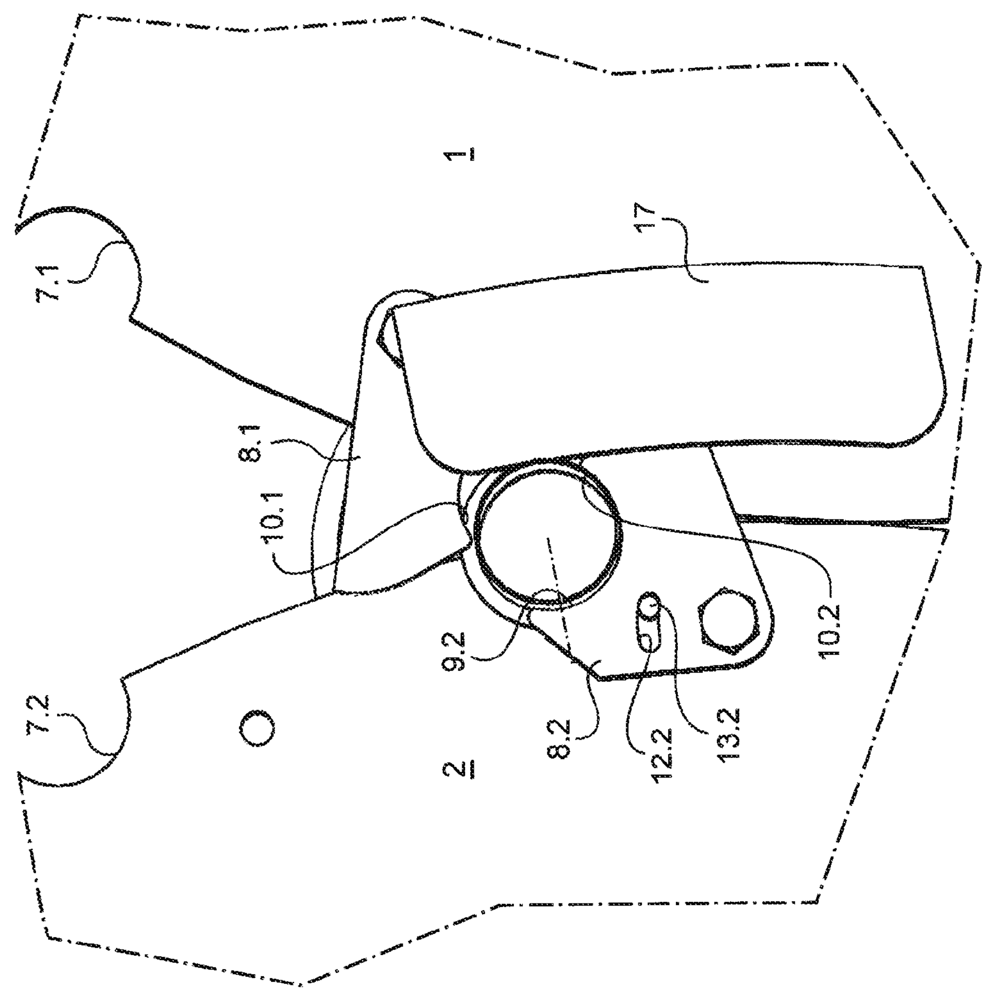
Figure 5:
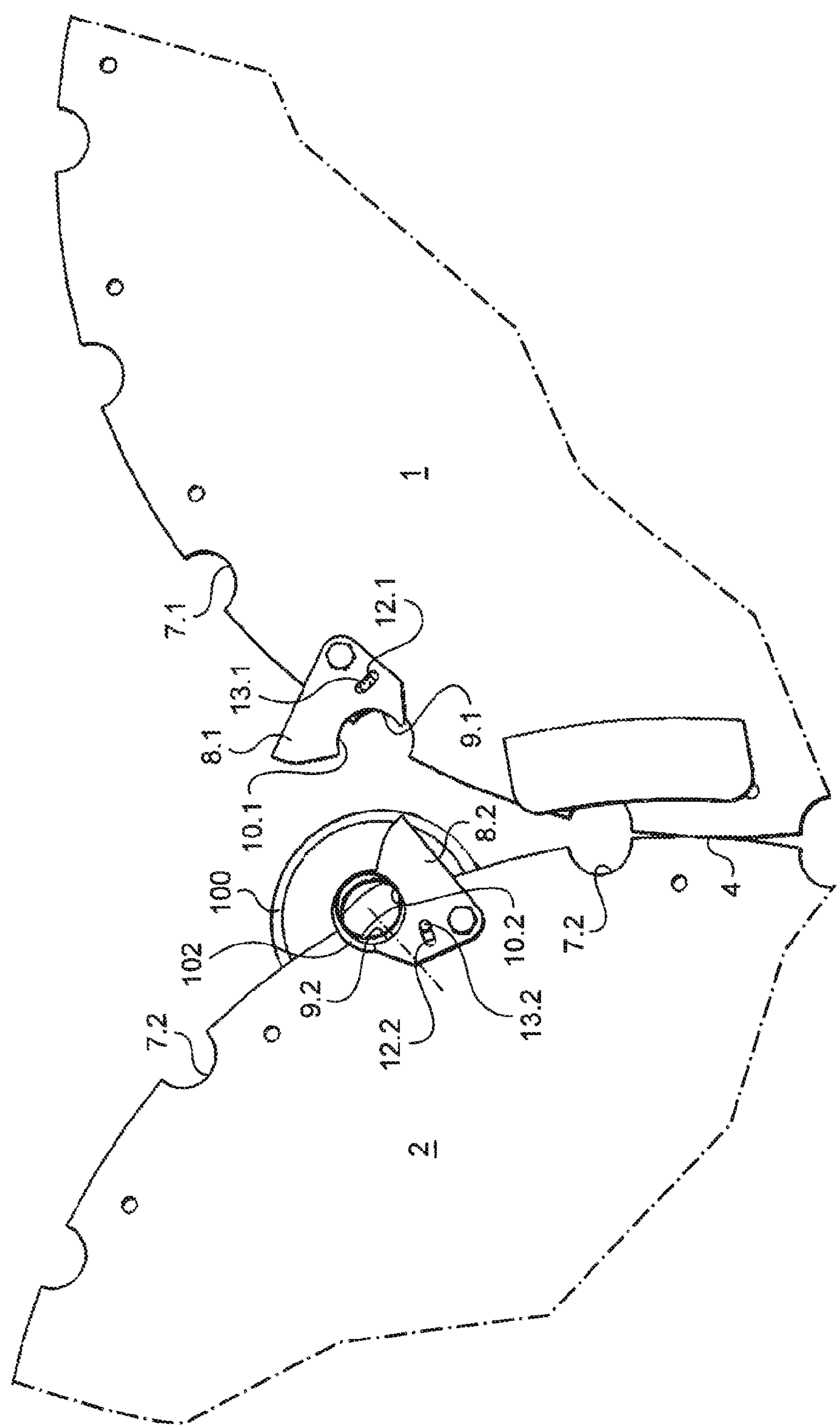
Figure 6:
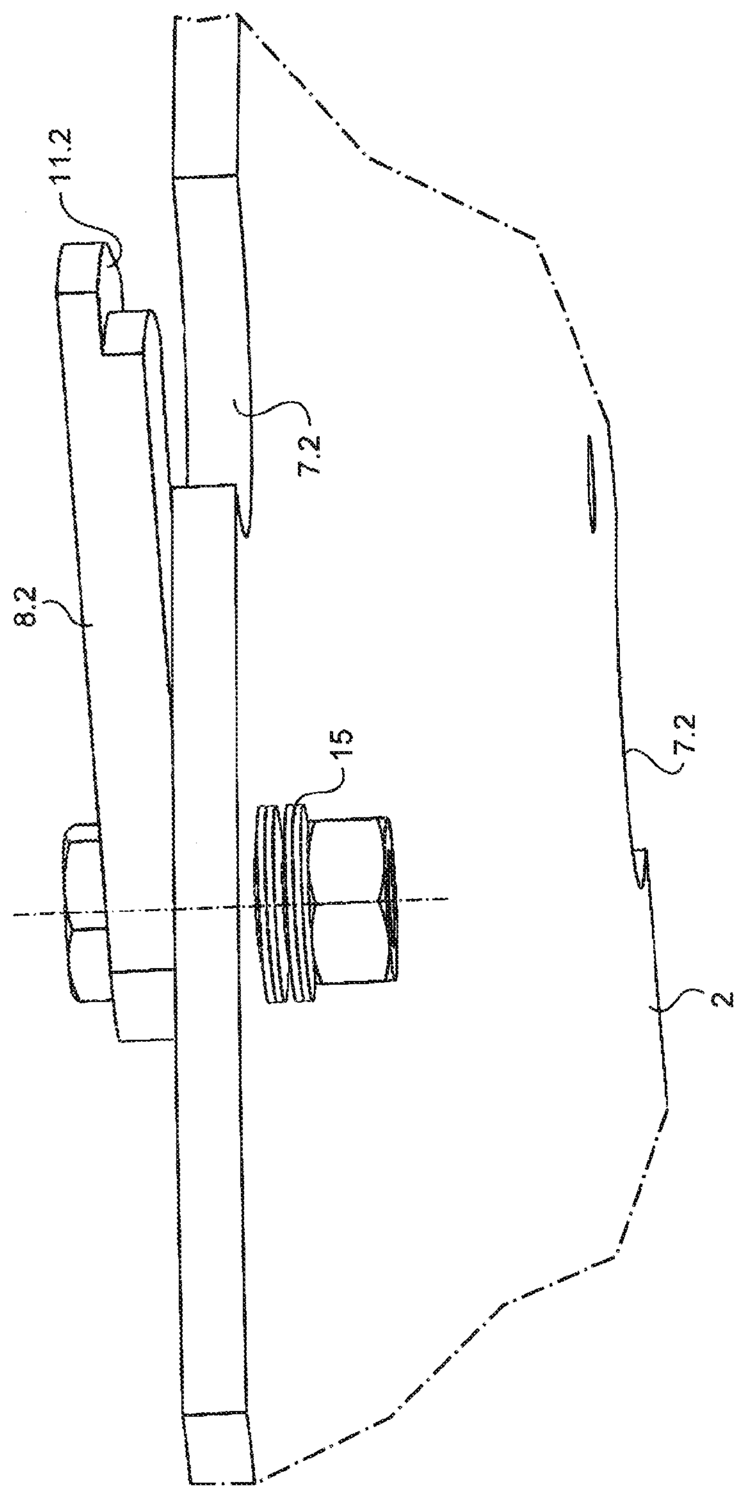
FIG. 6 is a fragmentary diagrammatic view of the installation shown in perspective and seen from below.

With reference to the figures, the transport installation of the invention is described herein in application to processing containers 100 each having a neck 101 provided with a collar 102 projecting laterally from the neck 101.

The transport installation of the invention comprises an upstream platform 1, an intermediate platform 2 that is tangential to the upstream platform 1 at a point of tangency 4, and a downstream platform 3 that is tangential to the intermediate platform 2 at a point of tangency 5. The platforms 1, 2, and 3 are mounted on a structure 6 so as to rotate. The transport installation also has a device for loading containers on the upstream platform 1 and a device for discharging containers from the downstream platform 3. These devices are themselves known and are therefore non described in detail herein.

The upstream platform 1 and the intermediate platform 2 are both provided with peripheral slots 7.1, 7.2. Each slot 7.1, 7.2 is constituted by a notch of circularly arcuate shape extending over a little less than 180° and having a radius that is slightly greater than the radius of the neck 101 in order to receive a portion of the neck 101, the collar 102 of said neck 101 resting on the portion of the top surface of the platform 1, 2 bordering the slot 7.1, 7.2.

In the vicinity of each notch 7.1, 7.2, the platform 1, 2 has a jaw 8.1, 8.2 mounted thereon to pivot between a closed position for holding a neck 101 of the container 100 in the slot 7.1, 7.2, and an open position enabling the neck 101 to be inserted into the slot 7.1, 7,2 and enabling it to be extracted from the slot 7.1, 7.2 (it should be observed that only one jaw 8.1 and only one law 8.2 are shown in the figures in order to avoid overcrowding them). Each jaw 8.1 extends downstream from the slot 7.1 with which it is associated over the upstream platform 1, and each jaw 8.2 extends upstream from the slot 7.2 with which it is associated on the intermediate platform 2.

Each jaw 8.1, 8.2 includes a notch defined by a wall of circularly arcuate shape forming a portion of a first contact surface 9.1, 9.2 for making contact with the neck 101, and a second contact surface 10.1, 10.2 for making contact with the neck 101. In this example, the circular arc has the same radius as the slot 7.1, 7.2, the neck 101 having the same diameter above the collar 102 and below it. When the jaw 8.1, 8.2 is in the closed position, the first contact surface 9.1, 9.2 extends over a central portion of the edge of the slot 7.1, 7.2 and the second contact surface 10.1, 10.2 extends substantially facing the first contact surface 9.1, 9.2 and partially closes access to the slot 7.1, 7.2. Each jaw 8.1, 8.2 has a bottom surface provided with a setback 11.1, 11.2 bordering the notch in order to receive the collar 102 when the jaw 8.1, 8.2 is closed on the neck 101.

Each jaw 8.1, 8.2 also has a circularly arcuate groove 12.1, 12.2 in which there is received a finger 13.1, 13.2 projecting from the top face of the platform 1, 2 in order to define the stroke of the jaw 8.1, 8.2 between its two positions. The finger 13.1, 13.2 and the walls defining the ends of the groove 12.1, 12.2 thus form stops defining the open and closed positions of the jaw 8.1, 8.2.

Finally, each jaw 8.1, 8.2 is provided with means for blocking it in each of its positions.

The blocking means are friction means that, in this example, are formed by a stack of Belleville type spring washers 15 that are mounted coaxially around the pivot axis of each of the jaws 8.1, 8.2 in order to urge the jaw against the platform 1, 2 and develop sufficient friction between the jaw 8.1, 8.2 and the platform 1, 2 to oppose the jaw 8.1, 8.2 moving from its closed position to its open position under the effect of the centrifugal force applied to the jaw 8.1, 8.2 itself, and also to the container held in the slot 7.1, 7.2. The spring washers 15 thus press a surface of the law 8.2 against the platform 2 in order to generate friction opposing pivoting of the jaw from either one of its positions to the other.

Finally, the installation has a rail 17 extending downstream relative to the travel direction of the containers 100 from the point of tangency between the upstream and intermediate platforms 1 and 2 in order to keep the containers on the intermediate platform 2 until the containers 100 are disengaged from the jaws 8.1 of the upstream platform 1. In this example, the rail 17 is substantially in the form of a circular arc centered on the center of rotation of the intermediate platform 2.

There follows a description of how one of the containers 100 is transported.

The container 100 is initially loaded in conventional manner into a slot 7.1 of the upstream platform 1, the corresponding law 8.1 being in the open position with its first contact surface 9.1 extending across the slot 7.1. When the neck 101 is inserted into the slot 7.1, it pushes against the first contact surface 9.1 and brings the jaw 8.1 from its open position to its closed position by acting against the blocking means. The blocking means then keep the jaw 8.1 in the closed position, the second contact surface 10.1 extending facing the slot 7.1 and opposing the neck 101 escaping from the slot 7.1.

A little upstream from the point of tangency 4, the slot 7.1 comes to face a slot 7.2 having its jaw 9.2 in the open position with its first contact surface 9.2 extending across the slot 7.2. As the slots 7.1 and 7.2 approach the point of tangency 4, the neck 101 comes into contact with the first contact surface 9.2 of the jaw 8.2 and moves it towards its closed position which is reached when the slot reaches the point of tangency 4. On leaving the point of tangency 4, the neck 101 comes into contact with the rail 17, which keeps the neck 101 in the slot 7.2 of the intermediate platform 2. The neck 101 then pushes against the second contact surface 10.1 of the jaw 8.1 and brings the law 8.1 into the open position by acting against the force of the blocking means. The container 100 is thus discharged from the upstream platform 1 and taken in charge by the intermediate platform 2.

Containers are transferred from the intermediate platform 2 to the downstream platform 3 as follows. In this example, the downstream platform 3 has clamps, each of which is controlled to take hold of the neck of a container received in a slot 7.2 facing the clamps at the point of tangency 5. Once the point of tangency 5 has been passed, the claims moves away from the slot as a result of the platforms 2 and 3 rotating and it pulls the container so that its neck forces the law 8.2 to open.

The containers are discharged from the downstream platform 3 in conventional manner.

Thus, it is the containers that move the jaws 8.1, 8.2 between their open and closed positions, which explains why there is no need to provide dedicated means for acting on the jaws 8.1, 8.2 in order to move them between their two positions.

Naturally, the invention is not limited to the embodiments described but covers any variant coming within the ambit of the invention as defined by the claims.

In particular, the Belleville washers could be replaced by some other resilient member such as a compression spring extending coaxially around the pivot axis of the law.

Each jaw may be made as a single part as shown, or it may be made up of a plurality of parts.

The upstream and/or downstream platforms may be of a structure different from that described, and they may include control clamps or jaws of the kind described.

The jaws need not have stop means.

In a variant, the blocking means include at least one resilient element for pressing the jaw both into its closed position and into its open position, and for exerting a peak force on the jaw when the jaw is in an intermediate position between the open and closed positions. By way of example, the resilient member may be a compression spring that extends parallel to the platform 1, 2 and that has one end secured to the platform 1, 2 and another end that bears against an off-axis portion of the jaw 8.1, 8.2 in such a manner that the resilient member is in a relatively lengthened state when the law 8.1, 8.2 is in its open and closed positions, and in a relatively shortened state when the law 8.1, 8.2 is in an intermediate position between its open and closed position.

The invention claimed is:

1. An installation for transporting containers having necks, the installation comprising an intermediate rotary platform provided in its periphery with slots and bordered by a feed unit for bringing containers into the slots and a unit for discharging containers from the slots, a jaw being mounted on the platform in the vicinity of each slot in order to pivot between a closed position for holding the container in the slot and an open position, each jaw being provided with blocking means for blocking it in each of its positions, and including a first contact surface projecting into the slot when the jaw is in the open position in such a manner that when the neck is inserted into the slot it pushes against the first contact surface and brings the jaw into the closed position, and a second contact surface facing the slot when the jaw is in the closed position in such a manner that when the neck is discharged from the slot it pushes against the second contact surface and brings the jaw into the open position.

2. An installation according to claim 1, wherein the platform has stops defining the closed and open positions.

3. An installation according to claim 1, wherein the blocking means are friction means.

4. An installation according to claim 3, wherein the friction means comprise a resilient member pressing a surface of the jaw against the platform in order to generate friction opposing pivoting of the jaw.

5. An installation for transporting containers having necks, the installation comprising an intermediate rotary platform provided in its periphery with slots and bordered by a feed unit for bringing containers into the slots and a unit for discharging containers from the slots, a jaw being mounted on the platform in the vicinity of each slot in order to pivot between a closed position for holding the container in the slot and an open position, each jaw being provided with blocking means for blocking it in each of its positions, and including a first contact surface projecting into the slot when the jaw is in the open position in such a manner that when the neck is inserted into the slot it pushes against the first contact surface and brings the jaw into the closed position, and a second contact surface facing the slot when the jaw is in the closed position in such a manner that when the neck is discharged from the slot it pushes against the second contact surface and brings the jaw into the open position;

wherein the blocking means comprise at least one resilient element for pressing against the jaw both in the closed position and in the open position and for exerting a force peak on the jaw when the jaw is in an intermediate position between the open and closed positions.

6. An installation according to claim 1, wherein each jaw comprises a notch defined by a circularly arcuate wall, of which the first contact surface and the second contact surface form portions.

7. An installation according to claim 1, wherein the feed unit is an upstream rotary platform that possesses means for holding containers on the upstream platform and that is tangential to the intermediate platform at a point of tangency.

8. An installation according to claim 2, wherein each stop comprises a finger that projects from the platform in order to be received in a circularly arcuate groove formed in the jaw.

9. An installation for transporting containers having necks, the installation comprising an intermediate rotary platform provided in its periphery with slots and bordered by a feed unit for bringing containers into the slots and a unit for discharging containers from the slots, a jaw being mounted on the platform in the vicinity of each slot in order to pivot between a closed position for holding the container in the slot and an open position, each jaw being provided with blocking means for blocking it in each of its positions, and including a first contact surface projecting into the slot when the jaw is in the open position in such a manner that when the neck is inserted into the slot it pushes against the first contact surface and brings the jaw into the closed position, and a second contact surface facing the slot when the jaw is in the closed position in such a manner that when the neck is discharged from the slot it pushes against the second contact surface and brings the jaw into the open position;

wherein the feed unit is an upstream rotary platform that possesses means for holding containers on the upstream platform and that is tangential to the intermediate platform at a point of tangency; and wherein the upstream platform is provided, like the intermediate platform, with slots and jaws forming holding means, each jaw extending downstream from the slot with which it is associated on the upstream platform or upstream from the slot with which it is associated on the intermediate platform, and a rail extending substantially downstream from the point of tangency of the platforms relative to the travel direction of the containers in order to keep the containers on the intermediate platform until the containers are disengaged from the holding means of the upstream platform.

* * * * *